(12) United States Patent
Watson et al.

(10) Patent No.: US 11,487,799 B1
(45) Date of Patent: Nov. 1, 2022

(54) SYSTEMS AND METHODS FOR DETERMINING AND REWARDING ACCURACY IN PREDICTING RATINGS OF USER-PROVIDED CONTENT

(71) Applicant: Heir Apparent, Inc., Los Angeles, CA (US)

(72) Inventors: Summer Watson, Los Angeles, CA (US); Lynette Perkins, Austin, TX (US)

(73) Assignee: Heir Apparent, Inc., Los Angeles, CA (US)

( * ) Notice: Subject to any disclaimer, the term of this patent is extended or adjusted under 35 U.S.C. 154(b) by 0 days.

(21) Appl. No.: 17/187,446

(22) Filed: Feb. 26, 2021

(51) Int. Cl.
*G06F 16/335* (2019.01)
*G06F 16/31* (2019.01)
*G06F 16/68* (2019.01)
*G06F 16/9038* (2019.01)
*G06F 16/9035* (2019.01)

(52) U.S. Cl.
CPC .......... *G06F 16/337* (2019.01); *G06F 16/313* (2019.01); *G06F 16/686* (2019.01); *G06F 16/9035* (2019.01); *G06F 16/9038* (2019.01)

(58) Field of Classification Search
None
See application file for complete search history.

(56) References Cited

U.S. PATENT DOCUMENTS

| | | |
|---|---|---|
| 8,050,987 B2 | 11/2011 | Liu |
| 8,145,526 B2 | 3/2012 | Redlich |
| 8,554,601 B1 * | 10/2013 | Marsh ................ G06Q 30/0278 705/7.32 |
| 8,561,099 B2 | 10/2013 | Demirtshian |
| 9,398,340 B2 | 7/2016 | Farb |
| 9,760,916 B1 | 9/2017 | Shapiro |
| 9,872,075 B2 | 1/2018 | Farb |

(Continued)

OTHER PUBLICATIONS

Jecko, "Digital media asset management", Broadcast Engineering 52.6:8, Future Publishing Ltd., ProQuest Document Id: 518329180, Jun. 2010.

*Primary Examiner* — Mark D Featherstone
*Assistant Examiner* — Navneet Gmahl
(74) *Attorney, Agent, or Firm* — Esplin & Associates, PC

(57) ABSTRACT

Systems and methods for determining and rewarding accuracy in predicting user-provided ratings of content provided by other users are disclosed. Exemplary implementations may: maintain user accounts associated with users including the first providing user and the second rating user; obtain individual items of user-provided content; effectuate presentations of the individual items of user-provided content through user interfaces to the individual users such that a first presentation is presented, through the second client computing platform, to the second rating user; receive rating information based on input received from the individual users through the user interfaces; determine values for ranking metrics of the individual items of user-provided content; compare the first value for the first ranking metric of the first item with the first rating information; determine, based on the comparison, a first correlation of the first rating information; and distribute an award to the second rating user in accordance with the determined first correlation, responsive to the determined first correlation breaching a threshold.

18 Claims, 4 Drawing Sheets

(56) References Cited

U.S. PATENT DOCUMENTS

| | | | |
|---|---|---|---|
| 9,942,189 B2 | 4/2018 | Green | |
| 10,769,678 B2 | 9/2020 | Li | |
| 11,151,665 B1 * | 10/2021 | Watson | G06Q 50/01 |
| 2004/0225577 A1 * | 11/2004 | Robinson | G06Q 30/02 |
| | | | 705/14.1 |
| 2005/0091075 A1 | 4/2005 | Cohen | |
| 2009/0083779 A1 * | 3/2009 | Shteyn | H04N 7/173 |
| | | | 725/14 |
| 2009/0157486 A1 * | 6/2009 | Gross | G06Q 30/0277 |
| | | | 705/319 |
| 2009/0327057 A1 | 12/2009 | Redlich | |
| 2010/0332296 A1 * | 12/2010 | Gharabally | G06Q 30/02 |
| | | | 705/14.2 |
| 2011/0145043 A1 * | 6/2011 | Handel | G06Q 30/02 |
| | | | 705/14.2 |
| 2012/0130860 A1 * | 5/2012 | Suzuki | G06Q 30/02 |
| | | | 705/27.1 |
| 2012/0158527 A1 | 6/2012 | Cannelongo | |
| 2014/0136305 A1 * | 5/2014 | Blumenthal | G06Q 30/0217 |
| | | | 705/14.19 |
| 2016/0048903 A1 | 2/2016 | Fujioka | |
| 2016/0162924 A1 | 6/2016 | Rathod | |
| 2018/0330281 A1 * | 11/2018 | Teller | G06N 20/00 |
| 2019/0180307 A1 * | 6/2019 | Cohen | G06Q 20/3255 |
| 2019/0268642 A1 | 8/2019 | Canney | |
| 2020/0394473 A1 * | 12/2020 | Dudik | G06N 20/00 |

\* cited by examiner

SYSTEMS AND METHODS FOR DETERMINING AND REWARDING ACCURACY IN PREDICTING RATINGS OF USER-PROVIDED CONTENT

FIELD OF THE DISCLOSURE

The present disclosure relates to systems and methods for determining and rewarding accuracy in predicting user-provided ratings of content provided by other users.

BACKGROUND

Online platforms that allow users to share content are known. Online platforms that allow users to publish user-provided content are known. Online platforms that allows users to rate, rank, and/or otherwise vote on posted content are known, such as, by way of example, YouTube™, Facebook™, and Reddit™.

SUMMARY

One aspect of the present disclosure relates to a system or systems. The system may include one or more hardware processors configured by machine-readable instructions. The processor(s) may be configured to store information. The stored information may include user account information related to user accounts of the users. The users may include a first providing user, a second rating user, and/or other users. Individual ones of the user accounts may be associated with individual ones of the users such that a first user account is associated with the first providing user and a second user account is associated with the second rating user. First account information may be related to the first user account. Second account information may be related to the second user account. The first providing user may be associated with a first client computing platform and the second rating user is provided with a second client computing platform. The processor(s) may be configured to maintain the user accounts associated with the users including the first providing user and the second rating user. Maintaining the first and second user account may include modifying the first and second account information. The processor(s) may be configured to obtain individual items of user-provided content. The individual items may include audio information. The individual items may be associated with individual ones of the individual users who provided the individual items such that a first item of user-provided content is associated with the first providing user who provided the first item. The first item may include first audio information. The processor(s) may be configured to effectuate presentations of the individual items of user-provided content through user interfaces to the individual users such that a first presentation is presented, through the second client computing platform, to the second rating user. The first presentation may include the first item of user-provided content and a first user interface configured to receive user input from the second rating user. The processor(s) may be configured to receive rating information based on input received from the individual users through the user interfaces. The rating information may include first rating information that is based on the received user input from the second rating user. The processor(s) may be configured to determine values for ranking metrics of the individual items of user-provided content. Determination of the values for the ranking metrics may be based on the received rating information such that a first determination of a first value for a first ranking metric of the first item is based at least in part on the received user input from the second rating user. The processor(s) may be configured to compare the first value for the first ranking metric of the first item with the first rating information. The processor(s) may be configured to determine, based on the comparison, a first correlation of the first rating information. The processor(s) may be configured to distribute an award to the second rating user in accordance with the determined first correlation, responsive to the determined first correlation breaching a threshold. Distribution of the award may include a modification of the second account information.

Another aspect of the present disclosure relates to a method or methods. The method may include storing information. The stored information may include user account information related to user accounts of the users. The users may include a first providing user, a second rating user, and/or other users. Individual ones of the user accounts may be associated with individual ones of the users such that a first user account is associated with the first providing user and a second user account is associated with the second rating user. First account information may be related to the first user account. Second account information may be related to the second user account. The first providing user may be associated with a first client computing platform and the second rating user is provided with a second client computing platform. The method may include maintaining the user accounts associated with the users including the first providing user and the second rating user. Maintaining the first and second user account may include modifying the first and second account information. The method may include obtaining individual items of user-provided content. The individual items may include audio information. The individual items may be associated with individual ones of the individual users who provided the individual items such that a first item of user-provided content is associated with the first providing user who provided the first item. The first item may include first audio information. The method may include effectuating presentations of the individual items of user-provided content through user interfaces to the individual users such that a first presentation is presented, through the second client computing platform, to the second rating user. The first presentation may include the first item of user-provided content and a first user interface configured to receive user input from the second rating user. The method may include receiving rating information based on input received from the individual users through the user interfaces. The rating information may include first rating information that is based on the received user input from the second rating user. The method may include determining values for ranking metrics of the individual items of user-provided content. Determination of the values for the ranking metrics may be based on the received rating information such that a first determination of a first value for a first ranking metric of the first item is based at least in part on the received user input from the second rating user. The method may include comparing the first value for the first ranking metric of the first item with the first rating information. The method may include determining, based on the comparison, a first correlation of the first rating information. The method may include distributing an award to the second rating user in accordance with the determined first correlation, responsive to the determined first correlation breaching a threshold. Distribution of the award may include a modification of the second account information.

As used herein, any association (or relation, or reflection, or indication, or correspondency) involving servers, processors, client computing platforms, user-provided content, presentations, ratings, rating information, users, accounts, account information, ranking metrics, experience metrics, values, comparisons, correlations, accuracies, determinations, assets, offers, transactions, rights, benefits, ownership, instructions, operations, distributions, transfers, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
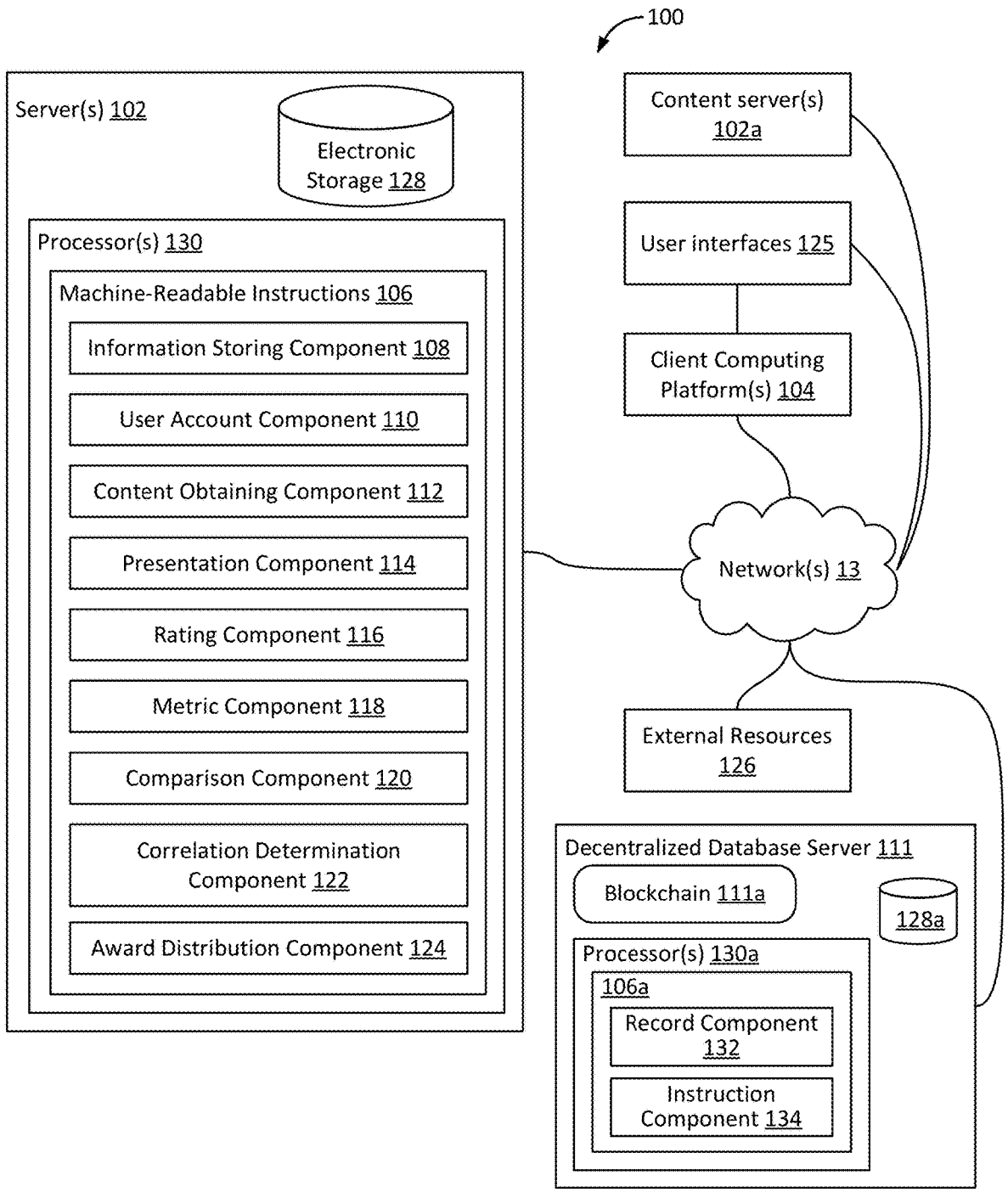
FIG. 1 illustrates a system configured for determining and rewarding accuracy in predicting ratings of user-provided content that is provided and rated by users, in accordance with one or more implementations.

FIG. 1 illustrates a system 100 configured for determining and rewarding accuracy in predicting ratings of user-provided content, in accordance with one or more implementations. As used herein, the term "user-provided content" may refer to content (particularly digital content) that includes audio information, including but not limited to songs, music, spoken word, interviews, comedy, theatre, podcasts, and/or other forms of information and/or entertainment. As used herein, the term "rating" may refer to a representation of an assessment and/or evaluation of the quality and/or merit of a particular item of content, and/or of an expectation or prediction thereof to be provided by multiple users. For example, a basic rating may represent whether a user likes or dislikes a song, and/or a prediction whether a majority of other users will like or dislike the same song.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104, e.g., through user interfaces 125. The users may include (content) providing users, rating (providing) users, and/or other types of users. For example, the users may include a first user, a second user, a third user, and so forth. For example, the providing users may include a first providing user, a second providing user, and so forth. For example, the rating users may include a first rating user, a second rating user, and so forth. In some implementations, an individual user may be both a providing user and a rating user. The first providing user may be associated with a first client computing platform 104 (and a first user interface 125), the second rating user may be associated with a second client computing platform 104 (and a second user interface 125), and so forth.

Server(s) 102 may be configured by machine-readable instructions 106. Machine-readable instructions 106 may include one or more instruction components. The instruction components may include computer program components. The instruction components may include one or more of information storing component 108, user account component 110, content obtaining component 112, presentation component 114, rating component 116, metric component 118, comparison component 120, correlation determination component 122, award distribution component 124, record component 132, instruction component 134, and/or other components. In some implementations, server(s) may include one or more content servers 102a. In some implementations, content server(s) 102a may be configured to effectuate presentations of user-provided content.

Information storing component 108 may be configured to store information in electronic storage 128 and/or other electronic storage. The stored information may include user account information related to user accounts of the users. Individual ones of the user accounts may be associated with individual ones of the users. For example, a first user account may be associated with a first user, a second user account may be associated with a second user, and so forth. First account information may be related to the first user account, second account information may be related to the second user account, and so forth. In some implementations, information storing component 108 may be configured to record and/or otherwise store information in blockchain 111a.

In some implementations, (user-specific) account information may include one or more metrics. For example, an experience metric may represent an amount of experience by a user in providing the user-provided content. Alternatively, and/or simultaneously, an experience metric may represent an amount of (a particular type of) ratings received by the user that has provided user-provided content (e.g., more favorable ratings may increase the represented amount and/or the corresponding experience metric). For example, a different experience metric may represent an amount of experience by a particular user in providing ratings of the individual items of user-provided content. Alternatively, and/or simultaneously, a different experience metric may represent an amount (a particular type of) ratings provided by the particular user that has provided ratings of the individual items of user-provided content (e.g., more accurate ratings may increase the represented amount and/or the corresponding experience metric). In some implementations, the one or more metrics may include a metric that represents success and/or accuracy in predicting (user-provided) ratings for user-provided content. In some implementations, account information may include a balance of a digital asset, including but not limited to one or more currencies. In some implementations, account information may link and/or otherwise refer to blockchain 111a.

User account component 110 may be configured to maintain the user accounts associated with the users. In some implementations, maintaining the user accounts may include managing user-specific inventories. For example, an inventory may include digital assets, currencies, balances of metrics (e.g., a particular value for a particular metric, including but not limited to experience metrics), virtual items, and/or other items. In some implementations, maintaining user accounts may include modifying the user account information. In some implementations, at least some account information may be recorded and/or otherwise stored in blockchain 111a.

Content obtaining component 112 may be configured to obtain individual items of user-provided content. The individual items may include audio information. In some implementations, the individual items may include audio-visual information. The individual items may be associated with individual ones of the individual users who provided the individual items such that a first item of user-provided content is associated with the first providing user who provided the first item. The first item of user-provided content may include first audio information. For example, a particular item of user-provided content may include a song and/or another piece of music. For example, the providing user who has provided the particular item may be the artist who created that particular song. Different providing users may provide different songs such that content obtaining component 112 may obtain the individual different songs for presentation to other users, including but not limited to rating users who provide ratings. In some implementations, content obtaining component 112 may be configured to host user-provided content. In some implementations, content obtaining component 112 may be configured to obtain user-provided content from one or more other servers, hosts, distribution platforms, and/or other providers, including but not limited to YouTube™, SoundCloud™, and/or other service providers. In some implementations, content obtaining component 112 may be configured to provide access to user-provided content, e.g., through a uniform resource locator (URL), a uniform resource identifier, a link, a code, and/or other information that refers to particular user-provided content.

Presentation component 114 may be configured to effectuate presentations to individual users, e.g., through client computing platforms 104 and/or user interfaces 125. In some implementations, individual items of user-provided content may be associated with individual providing users (e.g., the respective creators of the user-provided content). In some implementations, presentation component 114 may be configured to effectuate presentations of the individual items of user-provided content to the individual users. For example, presentation component 114 may effectuate a first presentation, through a particular client computing platform 104 and/or a particular user interface 125, to a particular (rating) user. For example, presentation component 114 may effectuate a second presentation, through a different client computing platform 104 and/or a different user interface 125, to a different (rating) user. For example, a particular presentation may include a particular item of user-provided content. In some implementations, the same item of user-provided content may be presented separately to multiple users, through multiple presentations. In some implementations, user interfaces 125 may be configured to receive user input from the (rating) users. For example, through presentation component 114, one or more songs may be presented to one or more rating users (e.g., via user interfaces 125 that are presented to the rating users). In some implementations, the same user interfaces may be used to both present items of user-provided content as well as receive user input from rating users. In some implementations user input may be (rating) user-specific and/or (user-provided) content-specific. For example, particular user input from a particular rating user may represent a rating by the particular rating user of a particular item of user-provided content (say, a particular song). For example, a rating may be positive or negative. In some implementations, a rating may be positive, negative, and/or neutral. In some implementations, a rating may be represented numerically. For example, a rating user may rate a song positively or negatively (e.g., using ☝ and ☟). In some implementations, a rating may represent an expectation and/or prediction of how the majority of rating users will rate and/or like the particular song. In some implementations, user-provided content may be presented at the same time as and/or contemporaneously with the provision of a rating from the rating user. For example, the particular song is presented to the particular rating user (using a particular user interface 125). While the song is playing (and/or, in some implementations, shortly thereafter), the particular rating user can provide user input that represents the rating by the particular rating user of the particular song (e.g., using the same particular user interface 125).

Rating component 116 may be configured to receive rating information. In some implementations, rating component 116 may be configured to receive rating information based on input received from individual users through user interfaces 125. The input may include one or more positive ratings, one or more negative ratings, and/or other ratings. Rating information may be based on the received user input from one or more rating users. In some implementations, particular individual user input may indicate a particular rating from a set of rating options. In some implementations, a set of rating options may include one or more positive rating options, one or more negative rating options, and/or zero or more other rating options. For example, in some implementations, the set of rating options may include "like" and "dislike", or "fire" and "trash", or "thumbs up" and "thumbs down." For example, in some implementations, the set of rating options may include "like", "dislike", and "neutral," or "fire", "trash", and "needs work", or "thumbs up", "thumbs down", and "meh". For example, in some implementations, the set of rating options may be a numerical scale, from 0 to 100, from 1 to 10, from 1 to 5, and so forth. For example, in some implementations, the set of rating options may be a letter grade (say, from "A" to "F"). Other rating options (numerical, non-numerical, and/or a mix of both) are considered within the scope of this disclosure. In some implementations, rating options may be represented using a graphical element, such as, for example, an icon or image.

Metric component 118 may be configured to determine values for metrics. In some implementations, the metrics may include ranking metrics of the individual items of user-provided content. In some implementations, the metrics may include experience metrics related to individual users. In some implementations, determination of the values for the ranking metrics may be based on information received from rating component 116. In some implementations, determination of the values for the ranking metrics may be based on the received rating information such that a first determination of a first value for a first ranking metric of a first item (of user-provided content) is based at least in part on the received user input from one or more particular (rating) users. Metric component 118 may be configured to determine values for ranking metrics of individual ones of the users. For example, an experience metric (related to a particular providing user) may be based at least in part on a particular ranking metric of a particular item (that has been provided by the particular providing user). In some implementations, determinations by metric component 118 may be based on aggregating numerical information. For example, the total number of positive ratings may be used to determine a particular ranking metric (e.g., a song's ranking metric may be 10,000 likes). For example, the ratio of positive versus negative ratings may be used to determine a particular ranking metric (e.g., a song's ranking metric may be 80% positive). For example, the average rating of numerical ratings may be used to determine a particular ranking metric (e.g., a song's ranking metric may have a value of 3.5 out of 5 stars). In some implementations, multiple ranking metrics may be combined and/or otherwise aggregated to determine a specific ranking metric.

An experience metric for a particular providing user may be based on ranking metrics for items of content provided by the particular providing user. For example, the particular experience metric may have a value of 50,000 likes, an average of 65% positive ratings, and so forth. An experience metric for a particular rating user may be based on ranking metrics for items of content for which the particular rating user has provided a rating. For example, the experience metric may have a value of 500 ratings (e.g., "likes" and "dislikes" combined), an average of 65% positive ratings, an accuracy value of 80%, and so forth. As used herein, accuracy may be determined by comparing the rating from the particular user with ratings from other users. For example, if the particular user liked a song, and the majority of the other users who provided a rating for the same song also like the song, the accuracy of the particular user may increase (in particular, the accuracy of the particular rating of liking this song). For example, if the particular user disliked a song, and the majority of the other users who provided a rating for the same song also dislike the song, the accuracy of the particular user may increase (in particular, the accuracy of the particular rating of disliking this song). Conversely, if the particular user liked a song, and the majority of the other users who provided a rating for the same song disliked the song, the accuracy of the particular user may decrease (in particular, the accuracy of the particular rating of liking this song). Likewise, if the particular user disliked a song, and the majority of the other users who provided a rating for the same song liked the song, the accuracy of the particular user may decrease (in particular, the accuracy of the particular rating of disliking this song).

In some implementations, determinations by metric component 118 may take other information into account. For example, if rating users can provide user input (corresponding to rating information) prior to the presentation of particular user-provided content being completed, the moment of rating/voting/providing the user input may be relevant to the determinations by metric component 118. For example, user input provided after the first 10 seconds of presenting a particular song may be weighed more heavily (or less heavily) as user input provided after the first 60 seconds of the presentation of the particular song, or after the entire song has completed. In some implementations, rating information may be weighed differently based on the number of rating users that have provided user input regarding particular user-provided content. For example, in some cases, earlier rating/voting may outweigh later rating/voting. For example, in some cases, rating/voting provided after some threshold event (e.g., the $1000^{th}$ vote, or the $1000^{th}$ positive vote, and so forth) may be counted less, or not at all. The rationale may be, in some implementations, that additional users jumping on the bandwagon after particular content (say, a song) has become popular (at least with the users of system 100) has less value and/or information than the (potentially more independent) opinions/ratings/votes of the earliest group of rating users. Determinations by metric component 118 pertaining to a particular rating users may be based, at least in part, on actions by other rating users (and/or the timing of actions by other rating users).

In some implementations, accurate rating may be valued more if the particular accuracy was rare. For example, assume only 100 rating users provide a rating for a particular song (e.g., in a particular period of time, such as an early-rating period). Further assume that much later, after a million ratings, the song has become very popular. If only 1 rating user in the set of the first 100 rating users provided a positive rating, this accuracy should be deemed more valuable (and awarded accordingly) than when 99 ratings users in the set of the first 100 rating users provided a positive rating.

Comparison component 120 may be configured to make comparisons involving (values of) ranking metrics, rating information, and/or other information. For example, a comparison may compare a particular value for a particular ranking metric of a particular item (of user-provided content) with particular rating information for the same item. The particular ranking metric may be based on rating information from multiple users. The particular rating information for the same item may be based on user input provided by a single rating user. For example, comparison component 120 may compare an 80% positive rating for a particular song with the particular rating or vote from a particular rating user. Responsive to the particular rating or vote being positive, the particular rating user was accurate (or rather, this particular rating or vote accurately predicted that a majority of rating users would like the song). Responsive to the particular rating or vote being negative, the particular rating user was inaccurate (or rather, this particular rating or vote was inaccurate in predicting that a majority of rating users would like the song).

In some implementations, comparison component 120 may be configured to make comparisons between the ranking metrics for different users. For example, a first providing user may be ranked higher than a second providing user, based on an experience metric. For example, a first rating user may be ranked higher than a second rating user, based on an experience metric. In some implementations, comparison component 120 may be configured to make comparisons between the ranking metrics for different items of user-provided content. For example, a first item of user-provided content may be ranked higher than a second item of user-provided content, based on a particular metric. In some implementations, rankings as determined by comparison component 120 may be presented to users, e.g., through user interfaces 125 and/or client computing platforms 104.

Correlation determination component 122 may be configured to determine correlations of (values of) ranking metrics, rating information, and/or other information. In some implementations, determinations by correlation determination component 122 may be based on comparisons by comparison component 120. In some implementations, correlations may indicate and/or correspond to a level of accuracy, e.g., in predicting values of ranking metrics. In some implementations, correlations may indicate and/or correspond to predictive power. For example, a first rating user may provide a positive rating for a song, whereas a second rating user provides a negative rating for the same song. Assuming, e.g., a 70% positive ranking metric for this particular song among a group of more than these two rating users (say, for example, a group of 100 or 1000 rating users), the correlation of the first user's positive rating may be greater than the correlation of the second user's negative rating. Conversely, assuming a less than 50% positive ranking metric, the correlation of the first user's positive rating may be smaller (or less) than the correlation of the second user's negative rating.

Award distribution component 124 may be configured to determine and/or distribute awards based on (values of) ranking metrics, rating information, and/or other information. In some implementations, award distribution component 124 may distribute different types of awards for different types of actions and/or accomplishments in system 100. For example, award distribution component 124 may distribute awards based on correlations determined by correlation determination component 122. In some implementations, award distribution component 124 may distribute awards based on metrics determined by metric component 118. In some implementations, award distribution component 124 may distribute awards based on comparisons made by comparison component 120. For example, in some implementations, award distribution component 124 may distribute awards to users for completing a particular presentation of user-provided content (e.g., listening to an entire song). For example, in some implementations, award distribution component 124 may distribute awards to users for completing at least a predetermined percentage (say 50%, 60%, 70%, 80%, or 90%) of a particular presentation of user-provided content. For example, in some implementations, award distribution component 124 may distribute awards to users for providing user input to rate and/or vote on user-provided content (e.g., regardless of correlation and/or accuracy levels). For example, in some implementations, award distribution component 124 may distribute awards to users for providing user input to rate and/or vote on user-provided content in a manner such that the corresponding correlation breaches a threshold. For example, the award may be in accordance with the determined correlation such that a higher correlation effectuates a greater award and/or a different type of award. For example, a first rating user may provide a positive rating for a song, whereas a second rating user provides a negative rating for the same song. Assuming, e.g., a 75% positive ranking metric for this particular song among a group of more than these two rating users (say, for example, a group of 100 or 1000 rating users), the award distributed to the first user may be greater than the award (if any) distributed to the second user. Conversely, assuming a less than 50% positive ranking metric, the award distributed to the first user (if any) may be smaller (or less) than the award distributed to the second user.

In some implementations, distribution of an award may include a modification of the account information of a particular user. In some implementations, awards may include in-system status, increased influence in future rating/ranking, and/or other perks. For example, a balance of a virtual object and/or currency as maintained in the account information of the particular user may be increased. In some implementations, an award distributed to a particular user may increase or decrease based on one or more particular metrics for the particular user. For example, assume a first and second rating user both get an award for providing a rating. In some cases, responsive to the first user having a greater value for their experience metric as a rating user than the second user, the award distributed to the first user may be greater than the award distributed to the second user. Accordingly, the user with more accurate predictions may receive greater awards. In some implementations, distribution of an award may include an increase of a value of the experience metric of a particular user. In some implementations, a balance of a virtual object and/or currency may be recorded (and/or modified) on a decentralized ledger, including, e.g., blockchain 111a. In some implementations, distribution component 124 may be configured to generate and transfer sets of instructions to decentralized database server 111 (in particular, to instruction component 134) to effectuate a transaction and/or modification on blockchain 111a.

In some implementations, server(s) 102, client computing platform(s) 104, and/or external resources 126 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more (hardware) processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, servers 102 may include one or more content servers 102a.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, 122, 124, 132, and/or 134, and/or other components. Processor(s) 130 may be configured to execute components 108, 110, 112, 114, 116, 118, 120, 122, 124, 132, and/or 134, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

In some implementations, system 100 may include one or more decentralized database servers 111 configured to host, implement, and/or otherwise provide one or more blockchains 111a. In some implementations, decentralized database server(s) 111 may include one or more of electronic storage 128a, processor(s) 130a, machine-readable instructions 106a, and/or other components. Electronic storage 128a may be similar to electronic storage 128 as described elsewhere in this disclosure, though included in decentralized database server(s) 111. Processor(s) 130a may be similar to processor(s) 130a as described elsewhere in this disclosure, though included in decentralized database server(s) 111. Machine-readable instructions 106a may be similar to machine-readable instructions 106 as described elsewhere in this disclosure, though included in decentralized database server(s) 111. Blockchain 111a may be used to record and/or otherwise store account information for users of system 100, as well as other information related to the operation of system 100.

In some implementations, blockchain 111a may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 111a. The smart contracts may be stored on blockchain 111a. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Blockchain 111a may implement a decentralized ledger that records rights pertaining to digital assets. For example, a blockchain is a type of ledger, as well as a type of decentralized database that records rights pertaining to digital assets. A given (digital) asset may be owned by a particular user. An asset may include anything of material value or usefulness that is owned by or on behalf of one or more users. In some implementations, a virtual item may be represented by a digital asset that is recorded on blockchain 111a. In some implementations, a right pertaining to an object (e.g., a distribution right) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual item (e.g., ownership) may be recorded on blockchain 111a. In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111a.

In some implementations, blockchain 111a may register transactions that modify ownership (and/or other rights) pertaining to digital assets. A smart contract may implement a (type of) digital asset. In some implementations, once a smart contract has been added to a blockchain, the smart contract may be referred to as published, posted, registered, and/or recorded. Elements of blockchain 111a may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information. By way of non-limiting example, digital assets may represent virtual items. In some implementations, virtual items may include one or more of (user-specific) metrics, (user-specific) balances, accomplishments, (user-specific) awards, toys, characters, accessories, in-system abilities, in-system skills, tools, pets, access rights within an online game, and/or other virtual items. In some implementations, virtual items may refer to any item or object within a gaming platform that a user may use, own, sell, trade, destroy, and/or otherwise effectuate a change of ownership of.

In some implementations, blockchain 111a may be publicly accessible and append-only. In some implementations, existing blocks of blockchain 111a can substantially not be altered or deleted, unless multiple copies are altered. This is unlikely to happen provided that multiple copies of blockchain 111a are stored on different computing platforms, e.g., in different geographical locations. Blockchain 111a may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

In some implementations, decentralized database servers 111 may include record component 132, instruction component 134, and/or other components. Record component 132 may be configured to record rights pertaining to digital assets on decentralized database server(s) 111 and/or blockchain 111a. In some implementations, record component 132 may record rights on a decentralized ledger implemented by decentralized database server 111. For example, the decentralized ledger may be a blockchain such as blockchain 111a. In some implementations, record component 132 may add, modify, and/or remove recorded rights. For example, in accordance with received instructions, record component 132 may transfer ownership of a particular digital asset from a first owner to a second owner (e.g., from an original owner to a new owner). In some implementations, record component 132 may be arranged, organized, and/or otherwise included in decentralized database server 111.

The recorded rights may include ownership rights, distribution rights, and/or other rights. For example, particular recorded rights may reflect ownership of a particular digital asset by a particular user. Recorded rights may be asset-specific. For example, distribution rights for a particular digital asset may designate rights to certain distributions of benefits upon an exchange involving the particular digital asset. For example, the asset-specific distribution rights for a particular digital asset may include one or more of (i) a right owned by a different user to a part of the benefits upon an exchange, (ii) a right owned by one or more stakeholders of system 100 to a part of the benefits upon an exchange, and/or other distribution rights. These parts of a benefit may have different sizes, percentages, and/or conditions.

Instruction component 134 may be configured to receive (sets of) instructions to add, modify, and/or remove recorded rights in blockchain 111a. For example, instruction component 134 may receive one or more sets of instructions from other components in system 100, including but not limited to award distribution component 124. Instruction component 134 may provide received sets of instructions to record component 132 for execution. In some implementations, instruction component 134 may be arranged, organized, and/or otherwise included in decentralized database server 111. In some implementations, user account information may be stored, at least in part, on blockchain 111a. For example, individual user accounts may include information that links to and/or otherwise refers to blockchain 111a. For example, a balance of credits, points, currencies, metrics, and/or other information may be recorded on blockchain 111a. In some implementations, distribution of an award may include a modification of a balance (and/or other information) on blockchain 111a.

Figure 3:
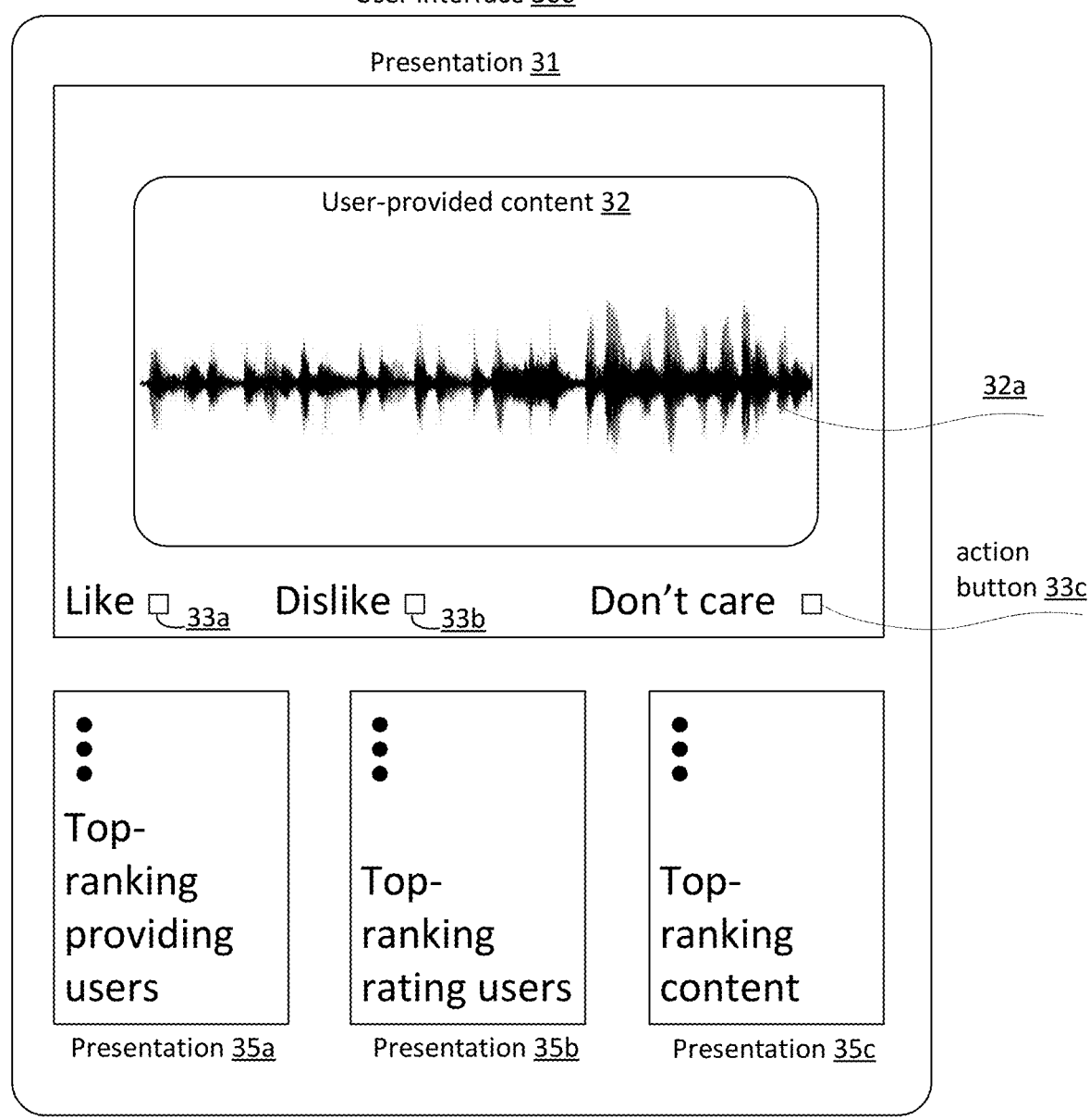
FIG. 3 illustrates a user interface, as may be presented to the users of a system as described, in accordance with one or more implementations.

By way of non-limiting example, FIG. 3 depicts a user interface 300, as may be presented to individual users through particular user interfaces 125. User interface 300 may include one or more presentations, e.g. a presentation 31, a presentation 35a, a presentation 35b, a presentation 35c, and/or other presentations. Presentation 31 may include user-provided content 32 (e.g., a song or a video, as represented by audio signals 32a). Presentation 31 may further include graphical user interface elements to facilitate interaction between a user and user interface 300. Here, the graphical user interface elements include action buttons (e.g., action buttons 33a, 33b, and 33c) that enable an individual user to interact. For example, one particular action button (action button 33a, labeled "Like") would, upon activation by the individual user, provide the user input to system 100 that represents a positive rating of user-provided content 32. For example, one particular action button (action button 33b, labeled "Dislike") would, upon activation by the individual user, provide the user input to system 100 that represents a negative rating of user-provided content 32. For example, one particular action button (action button 33c, labeled "Don't care") would, upon activation by the individual user, provide the user input to system 100 that represents neither a positive nor a negative rating of user-provided content 32. Presentation 35a presents a ranking of providing users of system 100. Presentation 35b presents a ranking of rating users of system 100. Presentation 35c presents a ranking of user-provided content of system 100. Information presented in presentations with ranking information, such as presentations 35a, 35b, and 35c, may be based on determinations and/or comparisons by comparison component 120.

Figure 4A:
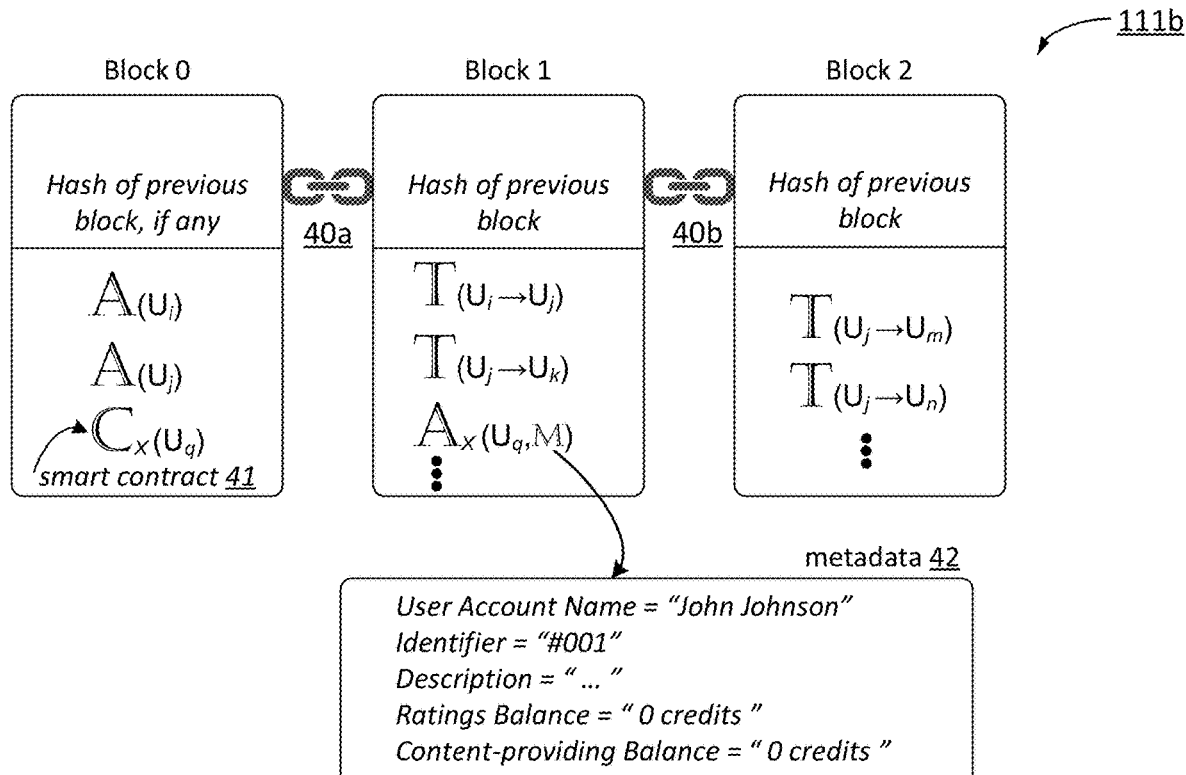
FIGS. 4A-4B illustrate exemplary blockchains as may be used by a system configured for determining and rewarding accuracy in predicting ratings of user-provided content, in accordance with one or more implementations.

By way of non-limiting example, FIG. 4A illustrates a blockchain 111b that includes a block 0, a block 1, and a block 2. As time progresses, more blocks may be added to blockchain 111b. The blocks within blockchain 111b are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 41 (indicated by a capital "C") that is assigned to or owned by user q (Uq). Smart contract 41 may implement a (limited) number of digital assets of a given type "X". A function call to a function defined by smart contract 41 (e.g., to request a particular type of usage, creation, and/or issuance of a digital asset of type "X") may be depicted and/or implemented as a transaction (e.g., the function may be invoked in exchange for consideration). In some implementations, smart contract 41 may have been posted to blockchain 111b by (or on behalf of) an owner or creator (here, user q). As used in the context of blockchains, assignments may record ownership. These assets and smart contracts may be individually manifested, deployed, and/or instantiated through a record component similar to record component 132 (see FIG. 1). Block 1 is connected to block 0 (as indicated by a link 40a), for example by including a (hashed) address of block 1 in block 0, or vice versa. Likewise, block 1 is connected to block 2, as indicated by a link 40b.

In block 1, one asset (labeled Ax) is assigned to user q (Uq), for example by associating an address of user q with asset Ax. Asset Ax may represent an individual digital asset of type "X". Asset Ax may be created and/or issued by invoking one or more function calls to smart contract 41. Asset Ax may have associated metadata 42 (indicated by a capital "M"), which may include and/or link to different types of information, including but not limited to one or more of a user account name (here, "John Johnson"), identifier, description, ratings balance, content-providing balance, and/or other information, as depicted. Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111b may determine the current assets of blockchain 111b, and the balances of any user (including John Johnson). In some implementations, the balances of a particular user may be verified prior to adding a transaction that reduces that particular user's balance. For example, an individual user may not be allowed to transfer assets the individual user does not own.

Figure 4B:
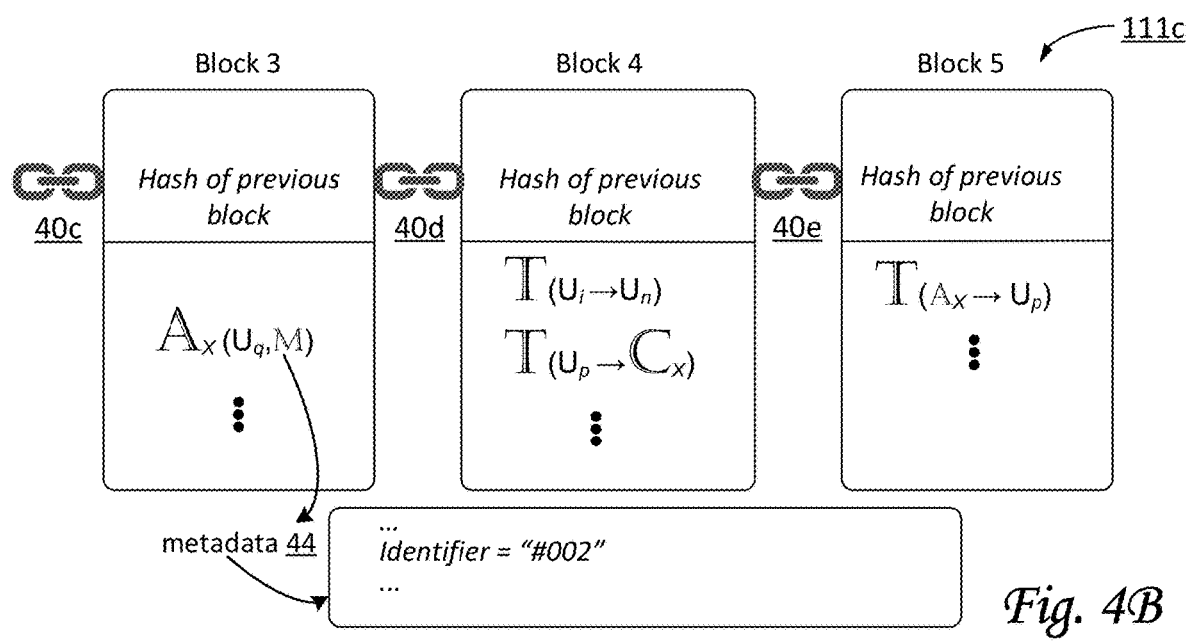

By way of non-limiting example, FIG. 4B illustrates a blockchain 111c that includes the same blocks as blockchain 111b of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, another asset (labeled Ax, having associated metadata 44) of type "X" is assigned to user q (Uq). At least the identifier (here, "#002") in metadata 44 will be different than the identifier in metadata 42 of FIG. 4A. Block 4 includes two transactions (indicated by a capital "T"): a first transaction from user i to user n. For example, the transaction may represent a purchase of a first virtual item by user n. Additionally, block 4 includes a second transaction from user p to the same smart contract as depicted in block 0. For example, the second transaction may represent user p offering to exchange a particular digital asset of the given type "X" for a particular benefit. A user who provides the particular benefit would receive ownership rights to the particular digital asset. Block 5 includes a transaction (indicated by a capital "T") involving the particular digital asset of the given type "X" (owned by user p). For example, the transaction in block 5 may modify the ratings balance and/or the content-providing balance associated with user p.

Referring to FIG. 1, user interfaces 125 may be configured to facilitate interaction between the users and system 100 and/or between the users and client computing platforms 104. For example, user interfaces 125 may provide an interface through which the users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

It should be appreciated that although components 108, 110, 112, 114, 116, 118, 120, 122, 124, 132, and/or 134 are illustrated in FIG. 1 as being implemented within a single processing unit, in implementations in which processor(s) 130 includes multiple processing units, one or more of components 108, 110, 112, 114, 116, 118, 120, 122, 124, 132, and/or 134 may be implemented remotely from the other components. The description of the functionality provided by the different components 108, 110, 112, 114, 116, 118, 120, 122, 124, 132, and/or 134 described below is for illustrative purposes, and is not intended to be limiting, as any of components 108, 110, 112, 114, 116, 118, 120, 122, 124, 132, and/or 134 may provide more or less functionality than is described. For example, one or more of components 108, 110, 112, 114, 116, 118, 120, 122, 124, 132, and/or 134 may be eliminated, and some or all of its functionality may be provided by other ones of components 108, 110, 112, 114, 116, 118, 120, 122, 124, 132, and/or 134. As another example, processor(s) 130 may be configured to execute one or more additional components that may perform some or all of the functionality attributed below to one of components 108, 110, 112, 114, 116, 118, 120, 122, 124, 132, and/or 134.

Figure 2:
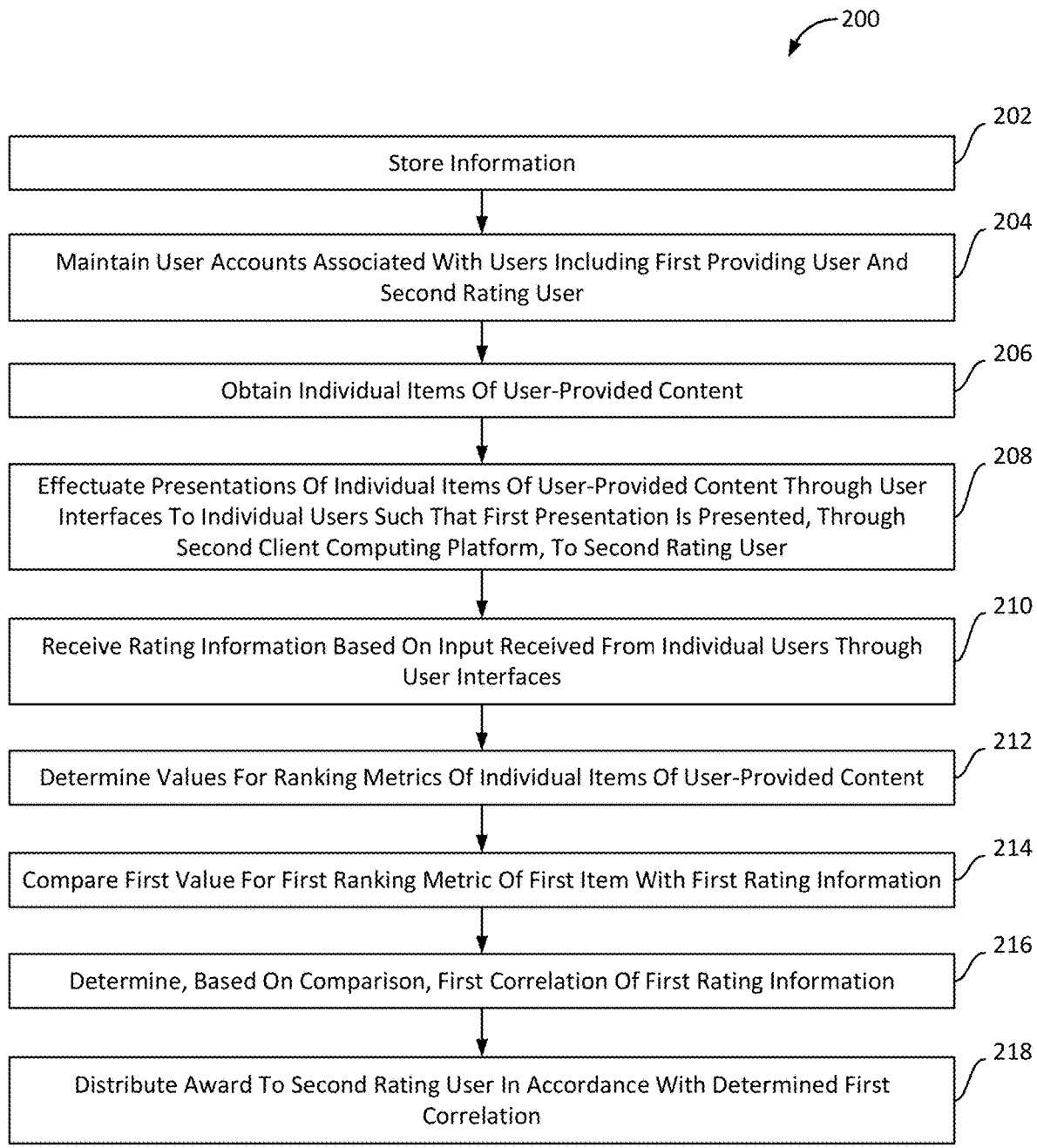
FIG. 2 illustrates a method for determining and rewarding accuracy in predicting ratings of user-provided content that is provided and rated by users, in accordance with one or more implementations.

FIG. 2 illustrates a method 200 for determining and rewarding accuracy in predicting user-provided ratings of content provided by other users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing information. The stored information may include user account information related to user accounts of the users. The users may include a first providing user and a second rating user. Individual ones of the user accounts may be associated with individual ones of the users such that a first user account is associated with the first providing user and a second user account is associated with the second rating user. First account information may be related to the first user account. Second account information may be related to the second user account. The first providing user may be associated with a first client computing platform and the second rating user is provided with a second client computing platform. Operation 202 may be performed by one or more hardware processors configured by machine-readable instructions including a component that is the same as or similar to information storing component 108, in accordance with one or more implementations.

An operation 204 may include maintaining the user accounts associated with the users including the first providing user and the second rating user. Maintaining the first and second user account may include modifying the first and second account information. Operation 204 may be performed by one or more hardware processors configured by machine-readable instructions including a component that is the same as or similar to user account component 110, in accordance with one or more implementations.

An operation 206 may include obtaining individual items of user-provided content. The individual items may include audio information. The individual items may be associated with individual ones of the individual users who provided the individual items such that a first item of user-provided content is associated with the first providing user who provided the first item. The first item may include first audio information. Operation 206 may be performed by one or more hardware processors configured by machine-readable instructions including a component that is the same as or similar to content obtaining component 112, in accordance with one or more implementations.

An operation 208 may include effectuating presentations of the individual items of user-provided content through user interfaces to the individual users such that a first presentation is presented, through the second client computing platform, to the second rating user. The first presentation may include the first item of user-provided content and a first user interface configured to receive user input from the second rating user. Operation 208 may be performed by one or more hardware processors configured by machine-readable instructions including a component that is the same as or similar to presentation component 114, in accordance with one or more implementations.

An operation 210 may include receiving rating information based on input received from the individual users through the user interfaces. The rating information may include first rating information that is based on the received user input from the second rating user. Operation 210 may be performed by one or more hardware processors configured by machine-readable instructions including a component that is the same as or similar to rating component 116, in accordance with one or more implementations.

An operation 212 may include determining values for ranking metrics of the individual items of user-provided content. Determination of the values for the ranking metrics may be based on the received rating information such that a first determination of a first value for a first ranking metric of the first item is based at least in part on the received user input from the second rating user. Operation 212 may be performed by one or more hardware processors configured by machine-readable instructions including a component that is the same as or similar to metric component 118, in accordance with one or more implementations.

An operation 214 may include comparing the first value for the first ranking metric of the first item with the first rating information. Operation 214 may be performed by one or more hardware processors configured by machine-readable instructions including a component that is the same as or similar to comparison component 120, in accordance with one or more implementations.

An operation 216 may include determining, based on the comparison, a first correlation of the first rating information. Operation 216 may be performed by one or more hardware processors configured by machine-readable instructions including a component that is the same as or similar to correlation determination component 122, in accordance with one or more implementations.

An operation 218 may include distributing an award to the second rating user in accordance with the determined first correlation, responsive to the determined first correlation breaching a threshold. Distribution of the award may include a modification of the second account information. Operation 218 may be performed by one or more hardware processors configured by machine-readable instructions including a component that is the same as or similar to award distribution component 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for determining and rewarding accuracy in predicting ratings of user-provided content, wherein the user-provided content is provided and rated by users, the users including a first providing user and a second rating user, wherein the first providing user is associated with a first client computing platform and the second rating user is assoicated with a second client computing platform, the system comprising:

electronic storage media configured to store information, wherein the stored information includes user account information related to user accounts, wherein individual ones of the user accounts are associated with individual ones of the users such that a first user account is associated with the first providing user and a second user account is associated with the second rating user, wherein first account information is related to the first user account, and wherein second account information is related to the second user account;

a content server configured to effectuate presentations of user-provided content that is provided by individual users, wherein the content server includes one or more hardware processors configured by machine-readable instructions to:

maintain the user accounts associated with the users, including the first providing user and the second rating user, wherein maintaining the first and second user account includes modifying the first and second account information;

obtain individual items of user-provided content, wherein the individual items include audio information, wherein the individual items are associated with individual ones of the individual users who provided the individual items such that a first item of user-provided content is associated with the first providing user who provided the first item, wherein the first item includes first audio information;

effectuate presentations of the individual items of user-provided content through user interfaces to the individual users such that a first presentation is presented, through the second client computing platform, to the second rating user, wherein the first presentation includes:
  (i) the first item of user-provided content, including the first audio information
  (ii) a first user interface configured to receive user input from the second rating user, wherein the received input from the second rating user represents a rating, by the second rating user, of the first item of user-provided content
receive rating information based on input received from the individual users through the user interfaces, wherein the rating information includes first rating information that is based on the received user input from the second rating user, wherein the first rating information includes the rating, by the second user, of the first item of user-provided content, and wherein the rating reflects an evaluation, by the second user, of the quality of the first item of user-provided content;
determine values for ranking metrics for individual ones of items of user-provided content, wherein determination of the values for the ranking metrics is based on the received rating information from multiple users, such that a first determination of a first value for a first ranking metric of the first item is based at least in part on the received user input from the second rating user and received rating information from multiple other users, wherein received rating information from the multiple other users represents ratings, by the multiple other users, of the first item of user-provided content;
compare the first value for the first ranking metric of the first item with the first rating information;
determine, based on the comparison, a first correlation degree for the first rating information and the first value for the first ranking metric of the first item, wherein the first correlation degree indicates a level of accuracy by the second rating user in predicting the first value for the first ranking metric of the first item; and
responsive to the determined first correlation degree breaching a threshold, determine and distribute an award to the second rating user in accordance with the determined first correlation degree, wherein distribution of the award includes a modification of the second account information.

2. The system of claim 1, wherein the received user input indicates a particular rating from a set of rating options, wherein the set includes at least a positive rating and a negative rating, wherein the particular rating rates the first item of user-provided content, and wherein the input includes one or more positive ratings and one or more negative ratings.

3. The system of claim 1, wherein the second account information includes an experience metric that represents an amount of experience by the second rating user in providing ratings of the individual items of user-provided content, and wherein the distribution of the award includes an increase of a value of the experience metric.

4. The system of claim 1, wherein the first account information includes an experience metric that represents an amount of experience by the first providing user in providing the user-provided content, wherein the experience metric is based at least in part on the first ranking metric of the first item.

5. The system of claim 2, wherein the users further include a third rating user, wherein the presentations include a second presentation presented, through a third client computing platform associated with the third rating user, to the third rating user, wherein the second presentation includes the first item of user-provided content, wherein the received rating information includes second rating information from the third rating user, wherein the first value for the first ranking metric is further determined based at least in part on the second rating information;
wherein the one or more hardware processors are further configured by machine-readable instructions to determine a second correlation degree for the second rating information and the first value for the first ranking metric of the first item;
wherein the one or more hardware processors are further configured by machine-readable instructions to distribute a second award to the third rating user in accordance with the determined second correlation degree responsive to the determined second correlation degree breaching the threshold.

6. The system of claim 5, wherein the second correlation degree of the second rating information indicates a second level of accuracy by the third rating user in predicting the first value for the first ranking metric of the first item.

7. The system of claim 6, wherein, responsive to the level of accuracy indicated by the first correlation degree being greater than the second level of accuracy indicated by the second correlation degree, the award is greater than the second award.

8. The system of claim 1, wherein the one or more hardware processors are further configured by machine-readable instructions to:
  determine values for ranking metrics of individual ones of the users;
  effectuate ranking presentations through the user interfaces, wherein the ranking presentations are based on the values for the ranking metrics of the individual ones of the users.

9. The system of claim 1, wherein the second account information is a balance of a digital asset, wherein the balance is recorded on a decentralized ledger.

10. A method for determining and rewarding accuracy in predicting ratings of user-provided content that is provided and rated by users, method comprising:
  storing information, wherein the stored information includes user account information related to user accounts of the users, wherein the users include a first providing user and a second rating user, wherein individual ones of the user accounts are associated with individual ones of the users such that a first user account is associated with the first providing user and a second user account is associated with the second rating user, wherein first account information is related to the first user account, wherein second account information is related to the second user account, and wherein the first providing user is associated with a first client computing platform and the second rating user is provided with a second client computing platform;
  maintaining the user accounts associated with the users, including the first providing user and the second rating user, wherein maintaining the first and second user account includes modifying the first and second account information;

obtaining individual items of user-provided content, wherein the individual items include audio information, wherein the individual items are associated with individual ones of the individual users who provided the individual items such that a first item of user-provided content is associated with the first providing user who provided the first item, wherein the first item includes first audio information;

effectuating presentations of the individual items of user-provided content through user interfaces to the individual users such that a first presentation is presented, through the second client computing platform, to the second rating user, wherein the first presentation includes the first item of user-provided content and a first user interface configured to receive user input from the second rating user, wherein the received input from the second rating user represents a rating, by the second rating user, of the first item of user-provided content;

receiving rating information based on input received from the individual users through the user interfaces, wherein the rating information includes first rating information that is based on the received user input from the second rating user, wherein the first rating information includes the rating, by the second rating user, of the first item of user-provided content, and wherein the rating reflects an evaluation, by the second rating user, of the quality of the first item of user-provided content;

determining values for ranking metrics for individual ones of items of user-provided content, wherein determination of the values for the ranking metrics is based on the received rating information from multiple users, such that a first determination of a first value for a first ranking metric of the first item is based at least in part on the received user input from the second rating user and received rating information from multiple other users, wherein received rating information from the multiple other users represents ratings, by the multiple other users, of the first item of user-provided content;

comparing the first value for the first ranking metric of the first item with the first rating information;

determining, based on the comparison, a first correlation degree for the first rating information and the first value for the first ranking metric of the first item, wherein the first correlation degree of the first rating information indicates a level of accuracy by the second rating user in predicting the first value for the first ranking metric of the first item; and distributing an award to the second rating user in accordance with the determined first correlation degree, responsive to the determined first correlation degree breaching a threshold, wherein distribution of the award includes a modification of the second account information.

11. The method of claim 10, wherein the received user input indicates a particular rating from a set of rating options, wherein the set includes at least a positive rating and a negative rating, wherein the particular rating rates the first item of user-provided content, and wherein the input includes one or more positive ratings and one or more negative ratings.

12. The method of claim 10, wherein the second account information includes an experience metric that represents an amount of experience by the second rating user in providing ratings of the individual items of user-provided content, and wherein the distribution of the award includes an increase of a value of the experience metric.

13. The method of claim 10, wherein the first account information includes an experience metric that represents an amount of experience by the first providing user in providing the user-provided content, wherein the experience metric is based at least in part on the first ranking metric of the first item.

14. The method of claim 11, wherein the users further include a third rating user, wherein the presentations include a second presentation presented, through a third client computing platform associated with the third rating user, to the third rating user, wherein the second presentation includes the first item of user-provided content, wherein the received rating information includes second rating information from the third rating user, wherein the first value for the first ranking metric is further determined based at least in part on the second rating information, the method further comprising:

determining a second correlation degree for the second rating information and the first value for the first ranking metric of the first item; and distributing a second award to the third rating user in accordance with the determined second correlation degree, responsive to the determined second correlation degree breaching the threshold.

15. The method of claim 14, wherein the second correlation degree of the second rating information indicates a second level of accuracy by the third rating user in predicting the first value for the first ranking metric of the first item.

16. The method of claim 15, wherein, responsive to the level of accuracy indicated by the first correlation degree being greater than the second level of accuracy indicated by the second correlation degree, the award is greater than the second award.

17. The method of claim 10, further comprising determining values for ranking metrics of individual ones of the users; and effectuating ranking presentations through the user interfaces, wherein the ranking presentations are based on the values for the ranking metrics of the individual ones of the users.

18. The method of claim 10, wherein the second account information is a balance of a digital asset, wherein the balance is recorded on a decentralized ledger.

\* \* \* \* \*